(12) United States Patent
Chen

(10) Patent No.: US 7,321,532 B2
(45) Date of Patent: Jan. 22, 2008

(54) PROTECTION DEVICE AND METHOD OF A READ AND WRITE MEDIUM APPARATUS

(75) Inventor: De-Sheng Chen, Taipei Xian (TW)

(73) Assignee: Peng Chun Wu, Hsinchu (TW)

( * ) Notice: Subject to any disclaimer, the term of this patent is extended or adjusted under 35 U.S.C. 154(b) by 592 days.

(21) Appl. No.: 10/986,887

(22) Filed: Nov. 15, 2004

(65) Prior Publication Data
US 2006/0044977 A1 Mar. 2, 2006

(30) Foreign Application Priority Data
Aug. 31, 2004 (CN) .................... 2004 1 0741325

(51) Int. Cl.
*G11B 7/00* (2006.01)
(52) U.S. Cl. ................ 369/53.18; 369/53.21
(58) Field of Classification Search ............... 369/53.1, 369/53.12, 53.13, 53.14, 53.15, 53.17, 53.18, 369/53.21
See application file for complete search history.

(56) References Cited

U.S. PATENT DOCUMENTS 6,480,375 B2* 11/2002 Horikoshi et al. .......... 361/685

* cited by examiner

*Primary Examiner*—Nabil Hindi
(74) *Attorney, Agent, or Firm*—Roger Chu

(57) ABSTRACT

The present invention provides a protection device and method of a read and write medium apparatus. When the read and write medium apparatus is operating, the protection device detects the external force and dynamically compels to cut the power supply off to remain the apparatus in non-operating condition. Besides, after the external force is withdrawn, the protection device can make the apparatus return to its prior operation operating condition. Thus, the invention enhances the shock-proof, drop-proof and collision-proof capabilities of the read and write medium apparatus and the protection thereof further.

20 Claims, 14 Drawing Sheets

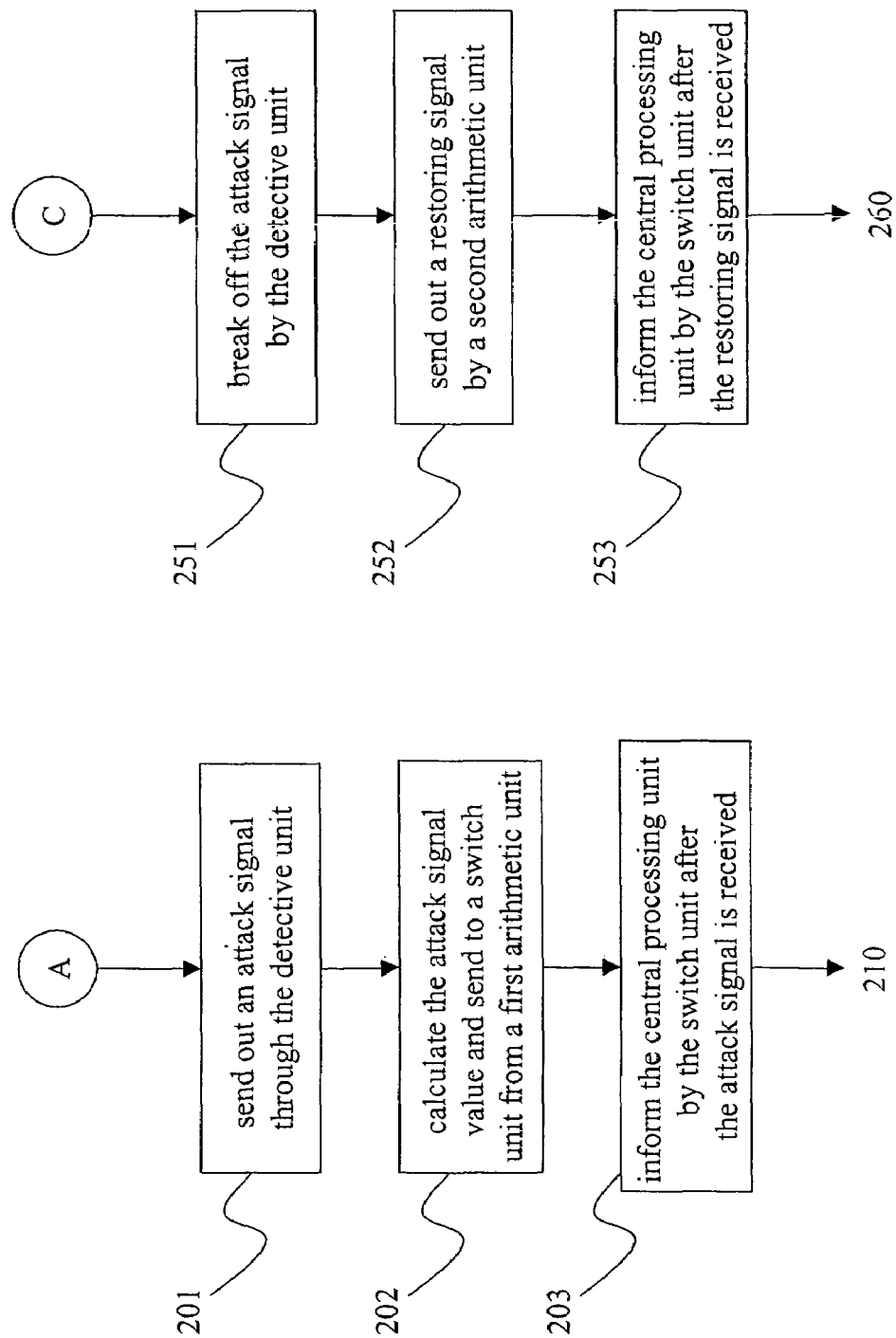

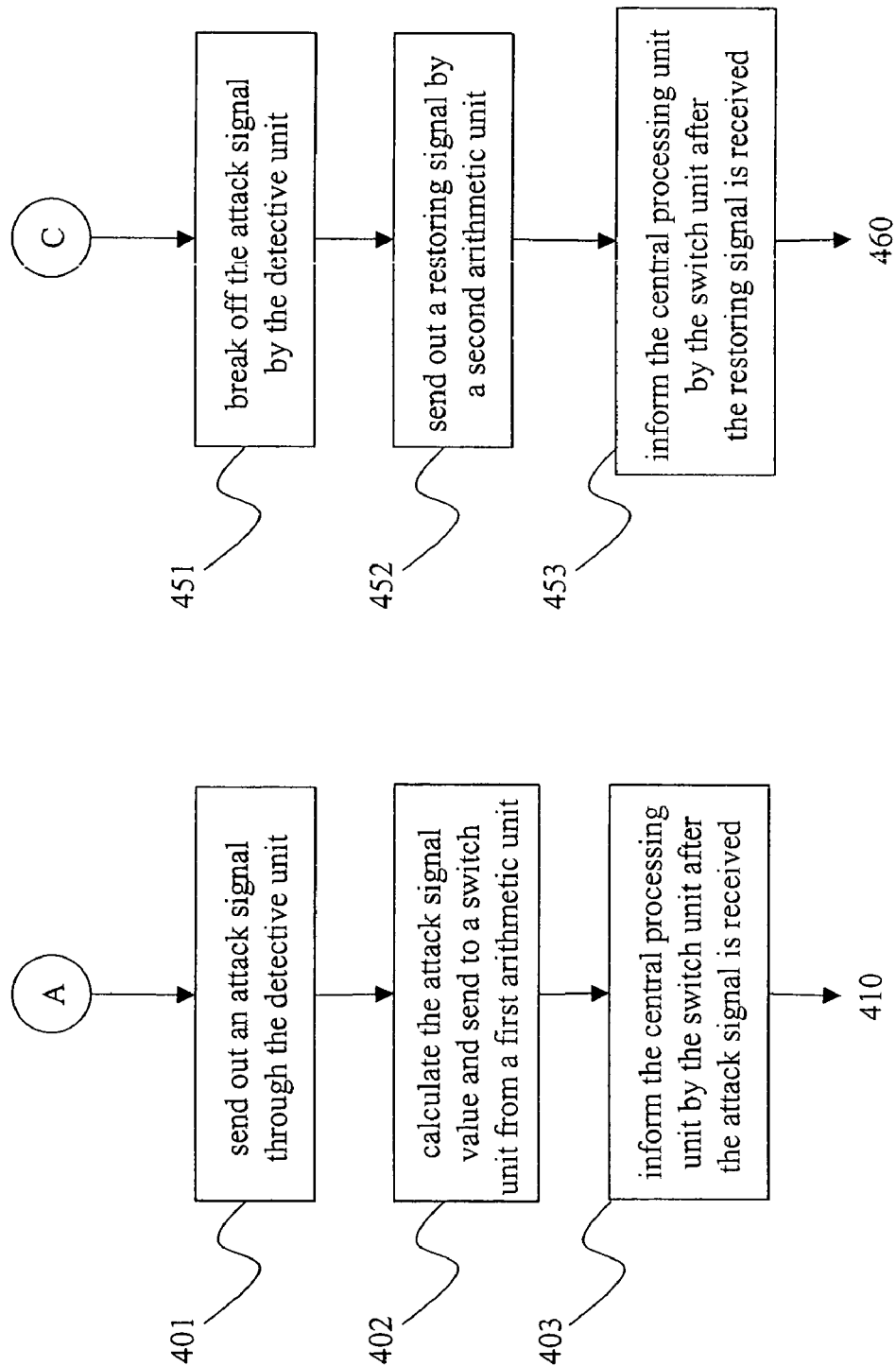

PROTECTION DEVICE AND METHOD OF A READ AND WRITE MEDIUM APPARATUS

BACKGROUND OF THE INVENTION (a) Field of the Invention

This Invention relates to a protection device and method of a read and write medium apparatus, in particular, to an apparatus with merits of data storage and readable and writable memory. The invention can be applied to various apparatuses, such as a portable Hard Disk Drive (HDD), a Pen Driver, a portable PC (Notebook computer), a personal digital assistant (PDA), a CD Walkman, a CD-ROM drive, a CD-RW drive, a DVD drive, a DVD player, a DVD-ROM, a DVD+RW, a DVD-RW drive, etc.

(b) Description of the Prior Art

With the rapid advancement of data processor technologies, nowadays computer hardware development is no longer confined to the application of conventional desktop computer systems. The popularization of related new and developing computer peripherals, such as notebook computer, Tablet PC, PDA, cellular phone, MP3 Player, CD Walkman, portable data processing apparatus, etc., enable a portable Hard Disk Drive (HDD) to be applied not only to a notebook computer, but also to in the automobile industry, such as an advanced In-Car navigation system and an audio/vedio system. Therefore, data processors are widely applied to information media.

In the century of the explosion of information, people have more demands on the capacity, speed and quality of data access and storage. Conventional data access devices applied with high density, such as Hard Disk Drives (HDD) and CD-ROM drives, both apply magnetic materials on plastic or metal boards for achieving the purpose of data storage. Such data storage method requires the main shaft motor to revolve with high speed and applies a mechanical pickup module (read/write head) to access data. Therefore, when a slight external force is on the apparatus while the pickup module is drifting back and forth on the disc at the speed of more than 5,400~10,000, such shock may either stop the data access process, or make the disc and the pickup module to contact each other and cause bad sectors on the disc or damage to the pickup module.

A solution was raised to apply a mechanical damping rubber to reduce the resonance, but it is an unreliable method as both HDD and CD-ROM drive possess an inevitable resonance effect during the operation; hence, the amendment of applying a damping rubber to the apparatus cannot increase the capablity of enduring the maximum stress. In addition, another compelling Parking method provided an idea of directly park a HDD or a CD-ROM drive during the operation when an external force applies thereto. The drawback of the method is that the power supply to the HDD or the CD-ROM drive still carries on, so that the HDD or the CD-ROM drive is possible to be re-started and data stored on the disc drive is easily lost. Moreover, it is inconvenient for a user to replay the data on the HDD or on the CD-ROM drive after the external force to the apparatus is eliminated.

Considering limited present technology resulting in the unstability of accessing data by a mechanical pickup module on conventional high density data access devices under shock or collision, how to improve the stability during the drive operation has become a subject to be solved.

In conclusion, the collision-proof and shock-proof capabilities between the invention in non-operating condition of HDD or CD-ROM drive and said methods in prior arts during the drive operation condition are considerable different (according to experimental results, the apparatus turns from operation condition to non-operating condition will enable shock-proof and drop-proof to range from 150 G to 1000 G, and vibration-proof to range from 0.7 G to 3 G).

SUMMARY OF THE INVENTION

In view of the foregoing drawbacks, the first objective of the invention provides a protection device and method of a read and write medium apparatus that dynamically protects the operation of the read and write medium apparatus against the damages owing to an external forces (e.g., shock, falling, vibration, etc.).

The second objective of the invention provides a protection device and method of a portable HDD to solve the problem when a portable HDD falls down or feels the vibration thereon. Seeing that such expensive and delicate HDD apparatuses easily cause damage or loss due to any external force applies thereto, the method provided by the invention makes use of the compelling power cut-off design to dynamically protect such portable HDD apparatuses from the damages when under an external forces (e.g., shock, falling, vibration, etc.).

The third objective of the invention provides a protection device and method of a CD device to solve the problem when a CD device (such as a CD-ROM drive, a CD-RW drive, a CD Walkman, a DVD player, a DVD-ROM, or a DVD+RW, a DVD-RW drive, etc.) falls down or feels the vibration thereon. Seeing that such expensive and delicate CD device easily cause damage or loss due to any external force applies thereto, the method provided by the invention makes use of the compelling power cut-off design to dynamically protect such CD device from the damages when under an external forces (e.g., shock, falling, vibration, etc.).

The first objective of the invention is to apply the following technology to a read and write medium apparatus to ensure the minimum damage thereto when incurring an external force. The protection device comprises (1) a detective unit for detecting an external force thereto, reckoning the value of an external force, sending an attack signal when the value is greater than a pre-set critical point and sending a restoring signal when the external force is removed; (2) a first arithmetic unit for informing a central processing unit of recording and restoring the operation statuses of said protection device, sending an interrupting signal when receiving the attack signal and sending a recovering signal when receiving the restoring signal; (3) a read and write medium unit for storing, reading and writing data; (4) a switch unit for controlling a power source of said protection device and resetting the power thereof when receiving the recovering signal; (5) an electricity control unit for achiving the electricity saturation while said read and write medium unit is operating, discharging electricity while said read and write medium unit cuts off the power, performing recharging and discharging functions; (6) a second arithmetic unit for evaluating a condition of said electricity control unit, sending a saturation interrupting signal when receiving the interrupting signal during the electricity saturation condition, sending a saturation restoring signal when receiving the recovery storing signal during the electricity saturation condition; and (7) a central processing unit for recording and restoring the operation status of the apparatus and carrying out the power cut-off when receiving the interrupting signal, carrying out the recording function and compelling to the power cut-off of the switch unit when receiving the saturation interrupting signal, cutting off the power and park the protection device when receiving the saturation interrupting signal and restoring to the prior operation status after the power supply is recovered.

The foresaid protection device of a read and write medium apparatus, wherein said read and write medium unit is a pickup module. The foresaid protection device of a read and write medium apparatus, wherein the read and write medium apparatus can be either a portable Hard Disk Drive (PHDD), a Pen Driver, a portable PC (Notebook computer), a personal digital assistant (PDA), a CD Walkman, a CD-ROM drive, a CD-RW drive. a DVD player, a DVD drive, a DVD-ROM, a DVD+RW, or a DVD−RW drive.

The first objective of the invention is to apply the following technology to a read and write medium apparatus to ensure the minimum damage thereto when incurring an external force. The protection method comprises following steps of determining if the value of an external force detected by the detective unit is greater than the pre-set critical point; recording the condition of the read and write media unit and sending an interrupting command through the central processing unit; determining if the electricity reaches the saturation point by the electricity control unit; compelling to the power cut-off of the read and write media unit through the central processing unit if the electricity reaches the saturation point; determining if the external force is removed through the detective unit; restoring the power supply of the read and write media unit through the central processing unit after the external force is removed; determining if the electricity reaches the saturation point again by the electricity control unit to avoid the electricity control unit from failing to carry out another protection control; and at last, restoring to the prior operation condition of the read and write media unit through the central processing unit.

The foresaid protection method of a read and write medium apparatus, wherein the critical point varies from the materials of constituting different read and write medium apparatuses.

The foresaid protection method of a read and write medium apparatus, wherein the step of detecting if the value of an external force greater than a critical point by a detective unit comprising the following steps of sending an attack signal through the detective unit; calculating the attack signal value and sending the value to a switch unit from a first arithmetic unit; and, informing the central processing unit after receiving the attack signal by the switch unit.

The foresaid protection method of a read and write medium apparatus, wherein the data processing apparatus can be either a portable Hard Disk Drive (PHDD), a Pen Driver, a portable PC (Notebook computer), a personal digital assistant (PDA), a CD Walkman, a CD-ROM drive, a CD-RW drive, a DVD player, a DVD drive, a DVD-ROM, a DVD+RW, or a DVD−RW drive.

The second objective of the invention is to apply the following technology to a portable HDD to ensure the minimum damage thereto when incurring an external force. The protection device comprises (1) a detective unit for detecting an external force thereto, reckoning the value of an external force, sending an attack signal when the value is greater than a pre-set critical point of said portable HDD and sending a restoring signal when the external force is removed; (2) a first arithmetic unit for informing a central processing unit of recording and restoring the operation statuses of said portable HDD, sending an interrupting signal when receiving the attack signal and sending a recovering signal when receiving the restoring signal; (3) a HDD for storing, reading and writing data; (4) a switch unit for controlling a power source of said HDD and resetting the power thereof when receiving the recovering signal; (5) an electricity control unit for achiving the electricity saturation while said HDD is operating, discharging electricity while said HDD cuts off the power, performing recharging and discharging functions; (6) a second arithmetic unit for evaluating a condition of said electricity control unit, sending a saturation interrupting signal when receiving the interrupting signal during the electricity saturation condition, sending a saturation restoring signal when receiving the recovery storing signal during the electricity saturation condition; and (7) a central processing unit for recording and restoring the operation status of said HDD and carrying out the power cut-off when receiving the interrupting signal, carrying out the recording function and compelling to the power cut-off of the switch unit when receiving the saturation interrupting signal, cutting off the power and park said HDD when receiving the saturation interrupting signal and restoring to the prior operation status after the power supply is recovered.

The second objective of the invention is to apply the following technology to a portable HDD to ensure the minimum damage thereto when incurring an external force. The protection method comprises following steps of determining if the value of an external force detected by the detective unit is greater than the pre-set critical point; recording the condition of said HDD and sending an interrupting command through the central processing unit; determining if the electricity reaches the saturation point by the electricity control unit; compelling to the power cut-off of said HDD through the central processing unit if the electricity reaches the saturation point; determining if the external force is removed through the detective unit; restoring the power supply of said HDD through the central processing unit after the external force is removed; determining if the electricity reaches the saturation point again by the electricity control unit to avoid the electricity control unit from failing to carry out another protection control; and at last, restoring to the prior operation condition of said HDD through the central processing unit. The foresaid protection method of a portable HDD, wherein the critical point varies from the materials of constituting respective portable Hard Disk Drive (HDD) exteriors.

The foresaid protection method of a portable HDD, wherein the step of detecting if the value of an external force greater than a critical point by a detective unit comprising the following steps of sending an attack signal through the detective unit; calculating the attack signal value and sending the value to a switch unit from a first arithmetic unit; and, informing the central processing unit after receiving the attack signal by the switch unit.

The foresaid protection method of a portable HDD, wherein the step of determining if the external force is removed by the detective unit comprising the following steps of breaking off the attack signal by the detective unit; sending a restoring signal by the second arithmetic unit; and, informing the central processing unit after receiving the restoring signal by the switch unit.

The third objective of the invention is to apply the following technology to a CD device to ensure the minimum damage thereto when incurring an external force. The protection device comprises (1) a detective unit for detecting an external force thereto, reckoning the value of an external force, sending an attack signal when the value is greater than a pre-set critical point of said CD device and sending a restoring signal when the external force is removed; (2) a first arithmetic unit for informing a central processing unit of recording and restoring the operation statuses of said CD device, sending an interrupting signal when receiving the attack signal and sending a recovering signal when receiving the restoring signal; (3) a CD device for storing, reading and writing data; (4) a switch unit for controlling a power source of said CD device and resetting the power thereof when receiving the recovering signal; (5) an electricity control unit for achiving the electricity saturation while said CD device is operating, discharging electricity while said CD device cuts off the power, performing recharging and discharging functions; (6) a second arithmetic unit for evaluating a condition of said electricity control unit, sending a saturation interrupting signal when receiving the interrupting signal during the electricity saturation condition, sending a saturation restoring signal when receiving the recovery storing signal during the electricity saturation condition; and (7) a central processing unit for recording and restoring the operation status of said CD device and carrying out the power cut-off when receiving the interrupting signal, carrying out the recording function and compelling to the power cut-off of the switch unit when receiving the saturation interrupting signal, cutting off the power when receiving the saturation interrupting signal and restoring to the prior operation status of said CD device after the power supply is recovered.

The foresaid protection device of a CD device, wherein the read and write medium apparatus can be either a CD Walkman, a CD-ROM drive, a CD-RW drive. a DVD player, a DVD drive, a DVD-ROM, a DVD+RW, or a DVD−RW drive.

The third objective of the invention is to apply the following technology to a CD device to ensure the minimum damage thereto when incurring an external force. The protection method comprises following steps of determining if the value of an external force detected by the detective unit is greater than the pre-set critical point; recording the condition of said CD device and sending an interrupting command through the central processing unit; determining if the electricity reaches the saturation point by the electricity control unit; compelling to the power cut-off of said CD device through the central processing unit if the electricity reaches the saturation point; determining if the external force is removed through the detective unit; restoring the power supply of said CD device through the central processing unit after the external force is removed; determining if the electricity reaches the saturation point again by the electricity control unit to avoid the electricity control unit from failing to carry out another protection control; and at last, restoring to the prior operation condition of said CD device through the central processing unit.

The foresaid protection method of a CD device, wherein the critical point varies from the materials of constituting respective CD device exteriors.

The foresaid protection method of a CD device, wherein the step of detecting if the value of an external force greater than a critical point by a detective unit comprising the following steps of sending an attack signal through the detective unit; calculating the attack signal value and sending the value to a switch unit from a first arithmetic unit; and, informing the central processing unit after receiving the attack signal by the switch unit.

The foresaid protection method of a CD device, wherein the step of determining if the external force is removed by the detective unit comprising the following steps of breaking off the attack signal by the detective unit; sending a restoring signal by the second arithmetic unit; and, informing the central processing unit after receiving the restoring signal by the switch unit.

The foresaid protection method of a CD device, wherein the data processing apparatus can be either a CD Walkman, a CD-ROM drive, a CD-RW drive, a DVD player, a DVD drive, a DVD-ROM, a DVD+RW, or a DVD−RW drive.

The major objective of a protection device and method of a read and write medium apparatus of the invention is to ensure the minimum damage to the read and write medium apparatus by way of the method design of forcedly power cut-off during shock, drop and/or vibration.

The invention provides a protection device to protect a read and write medium apparatus such as a portable Hard Disk Drive (HDD), a Pen Driver, a portable PC (Notebook computer), a personal digital assistant (PDA), a CD Walkman, a CD-ROM drive, a CD-RW drive, a DVD drive, a DVD player, a DVD-ROM, a DVD+RW, a DVD−RW drive, etc. When a read and write medium apparatus operating, a detective unit detects an external force thereto, and when the value of an external force is greater than a certain value, the protection device forcedly cuts off the power of the read and write medium apparatus, so that the apparatus is in a non-operating condition with the maximum stress, and then enhances the shock-proof and vibration-proof capability thereof. According to experimental results, the numbers of shock-proof and drop-proof can be from 150 G to 1000 G, in addition, the values of vibration-proof can range from 0.7 G to 3 G.

The detective unit of the invention can further increase the reliablity of the read and write medium apparatus; the electricity control unit of the invention can enable the pickup module to park its position during the power cut-off of the read and write medium apparatus; in addition, the central processing unit can record the operation condition of the apparatus prior to the external force invasion. The apparatus can be restored to the prior operation condition without further process of setting up any configuration after the external force is removed. Therefore, the invention provides a convenient design for a user to operate the apparatus.

The disclosed method according to the invention at least comprises the following steps of determining if the value of an external force detected by the detective unit is greater than the pre-set critical point, recording the condition of the read and write media unit and sending an interrupting command through the central processing unit, determining if the electricity reaches the saturation point by the electricity control unit, compelling to the power cut-off of the read and write media unit through the central processing unit if the electricity reaches the saturation point, determining if the external force is removed through the detective unit, restoring the power supply of the read and write media unit through the central processing unit after the external force is removed and determining if the electricity reaches the saturation point again by the electricity control unit to avoid the electricity control unit from failing to carry out another protection control and at last restoring to the prior operation condition of the read and write media unit through the central processing unit.

In conclusion, the invention presents a protection device and method of a read and write medium apparatus. When the read and write medium apparatus is operating, the protection device detects the external force and dynamically compels to cut the power supply off to remain the apparatus in non-operating condition. Besides, after the external force is withdrawn, the protection device can make the apparatus return to its prior operation operating condition. Thus, the invention enhances the shock-proof, drop-proof and collision-proof capabilities of the read and write medium apparatus and the protection thereof further.

To enable a further understanding of the structural features and the technical contents of the invention, the brief description of the drawings below is followed by the detailed description of embodiments.

BRIEF DESCRIPTION OF THE DRAWINGS

FIGS. 2A, 2B, 2C and 2D are flow charts of a first embodiment of the protection device of a read and write medium apparatus according to the invention;

FIGS. 6A, 6B, 6C and 6D are flow charts of the protection method of a CD device illustrated in the second embodiment according to the invention.

DETAILED DESCRIPTION OF THE PREFERRED EMBODIMENTS

The major objective of a protection device and method of a read and write medium apparatus of the invention is to ensure the minimum damage to the read and write medium apparatus by way of the method design of forcedly power cut-off during shock, drop and/or vibration.

Figure 1:
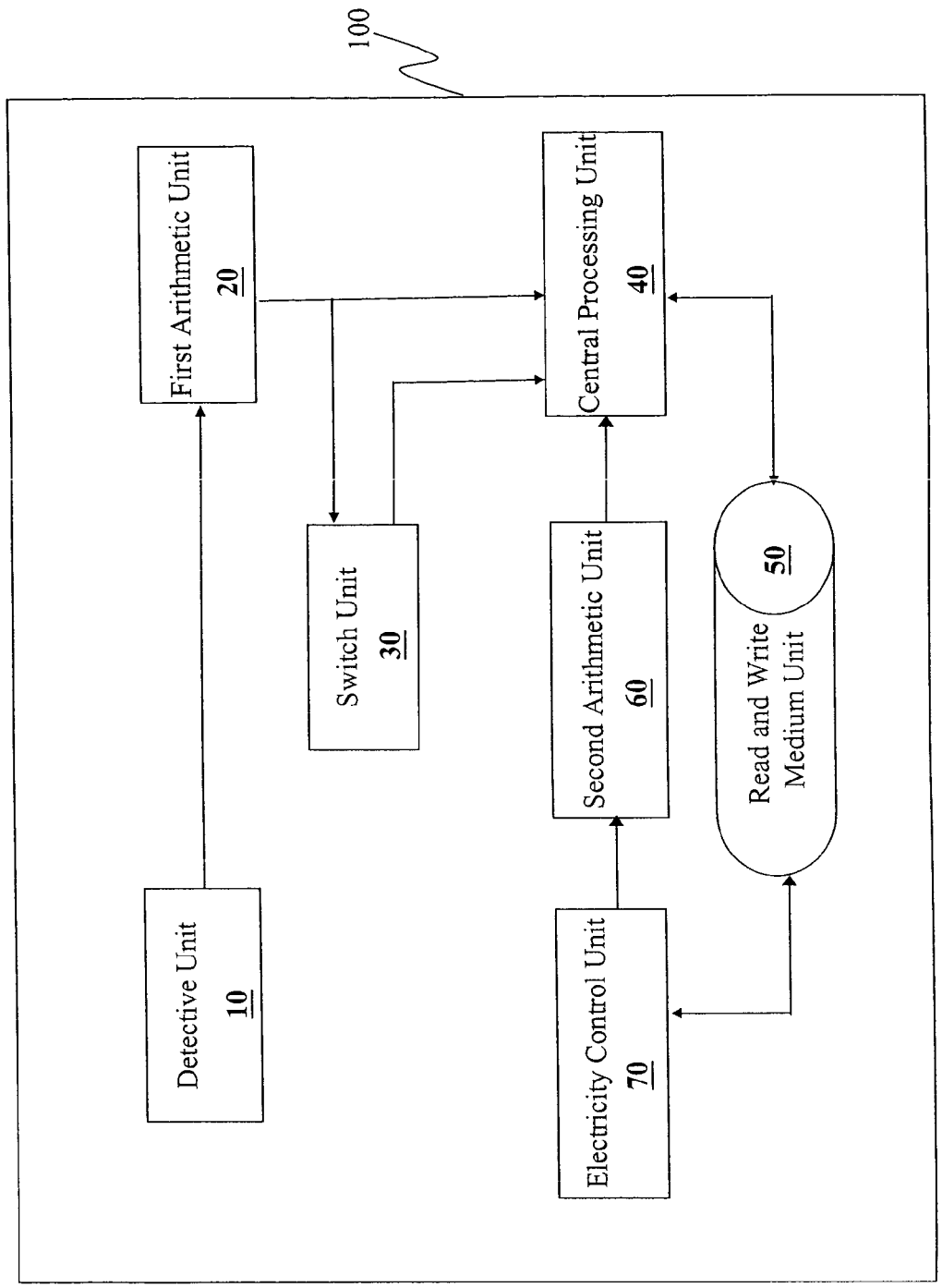
FIG. 1 is a block diagram of the protection device of a read and write medium apparatus according to the invention.

Prior to the introduction of the invention, the fundamental structure of the invention is described first. FIG. 1 is a block diagram of the protection device of a read and write medium apparatus according to the invention.

The protection device of a read and write medium apparatus 100 according to the invention comprises the following units.

A detective unit 10, which is to detect an external force and calculate the external force value. When the external force value is greater than a critical point pre-set by the protection device 100 an attack signal is then sent out; a restoring signal is sent out when the external force is removed. Said signals are sent to respective units accordingly for the protection device 100 to carry out different functions.

A first arithmetic unit 20 is to inform a central processing unit 40 of recording and restoring the condition of the protection device 100 of a read and write medium apparatus. When the attack signal is received, an interrupting signal is sent out, and when the restoring signal is received, a recovering signal is sent out. Said signals are respectively sent to various units to carry out their functions accordingly.

A read and write medium unit 50, which has a pickup module component with the function of date storage, is to store, read and write data in the protection device 100 of a read and write medium apparatus. A switch unit 30 is to carry out the switch on/off of the protection device 100 of a read and write medium apparatus. When the recovering signal is received, the power of the read and write medium unit 50 is on to restart the power supply to the apparatus.

An electricity control unit 70 is to reach the electricity saturation condition when the read and write medium unit 50 is operating and to discharge when the read and write medium unit 50 is in the non-operating condition; the operation of the electricity control unit 70 can be the reference given to the central processing unit 40 for restoring the apparatus. The electricity control unit 70 has a component of carrying out recharging and discharging functions.

A second arithmetic unit 60 is to evaluate the condition of the electricity control unit 70. When an interrupting signal is received during the electricity saturation condition, a saturation interrupting signal is sent out to inform the central processing unit 40 that the electricity control unit 70 reaches the electricity saturation condition; a saturation restoring signal is sent out when a recovering signal is received during the electricity saturation condition.

A central processing unit 40 is to carry out signals in the protection device 100 of a read and write medium apparatus and to record and restore the operation condition of the protection device 100 of a read and write medium apparatus. When an interrupting signal is received, the operation condition is recorded and the power cut-off process is waited; when the saturation interrupting signal is received, the switch unit 30 is forced to carry out the power cut-off; when the saturation restoring signal is received, the operation condition of the protection device 100 of a read and write medium apparatus is restored.

The said units are connected to each others to carry out different functions by way of signals illustrated in the Figure.

The said read and write medium apparatus can be any devices with a pickup module and the capability of data storage, such as a portable Hard Disk Drive (HDD), a Pen Driver, a portable PC (Notebook computer), a personal digital assistant (PDA), a CD Walkman, a CD-ROM drive, a CD-RW drive, a DVD drive, a DVD player, a DVD-ROM, a DVD+RW, a DVD−RW drive, etc.

With the units of the invention definited in preceding paragraphs, the read and write medium apparatus can be protected against the shock, drop, and/or collision accidents. The protection processes are described in details as follows through FIGS. 2A, 2B, 2C and 2D showing flow charts of a first embodiment of the protection device of a read and write medium apparatus according to the invention.

Figure 2A:
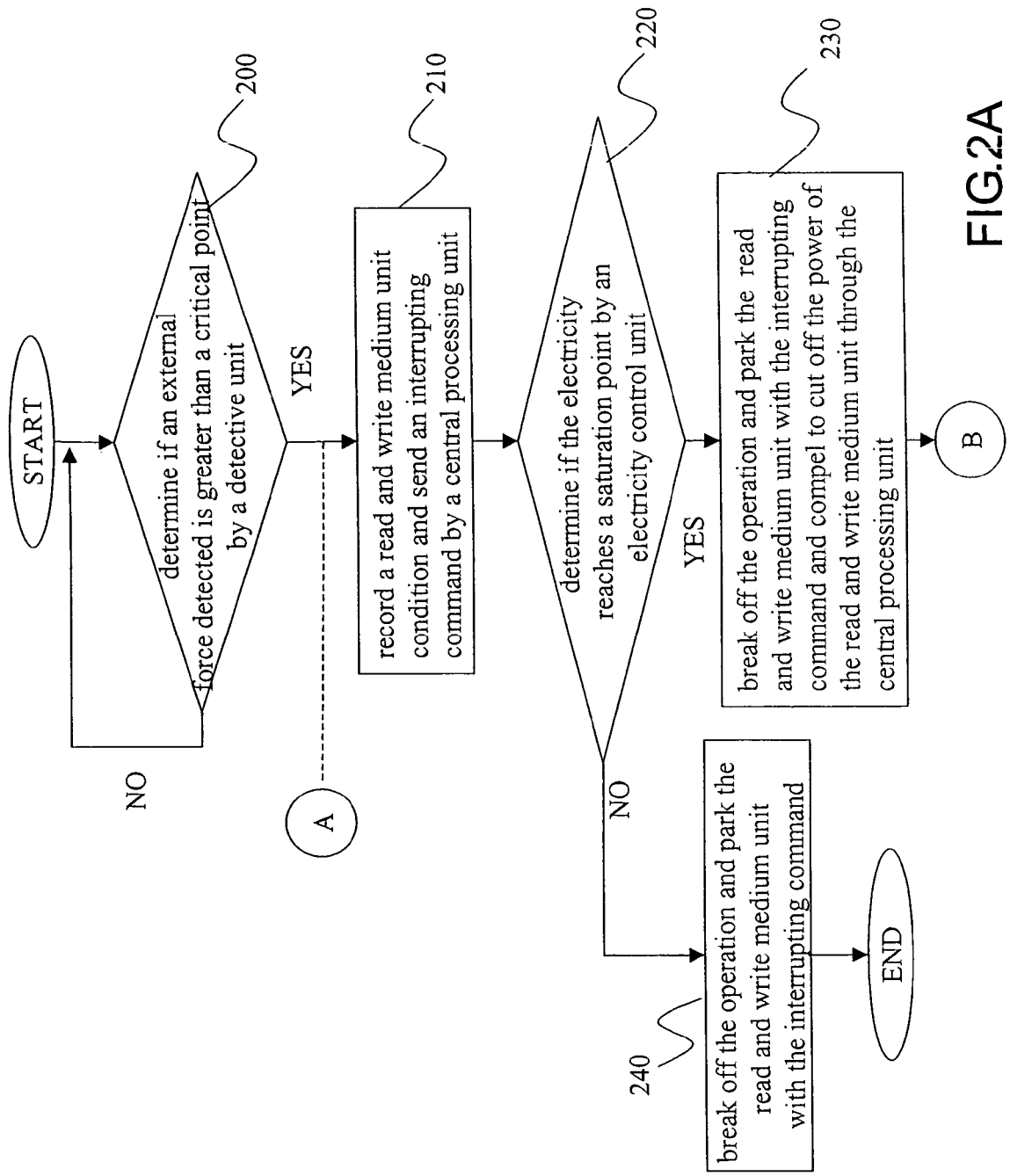
Figure 2B:
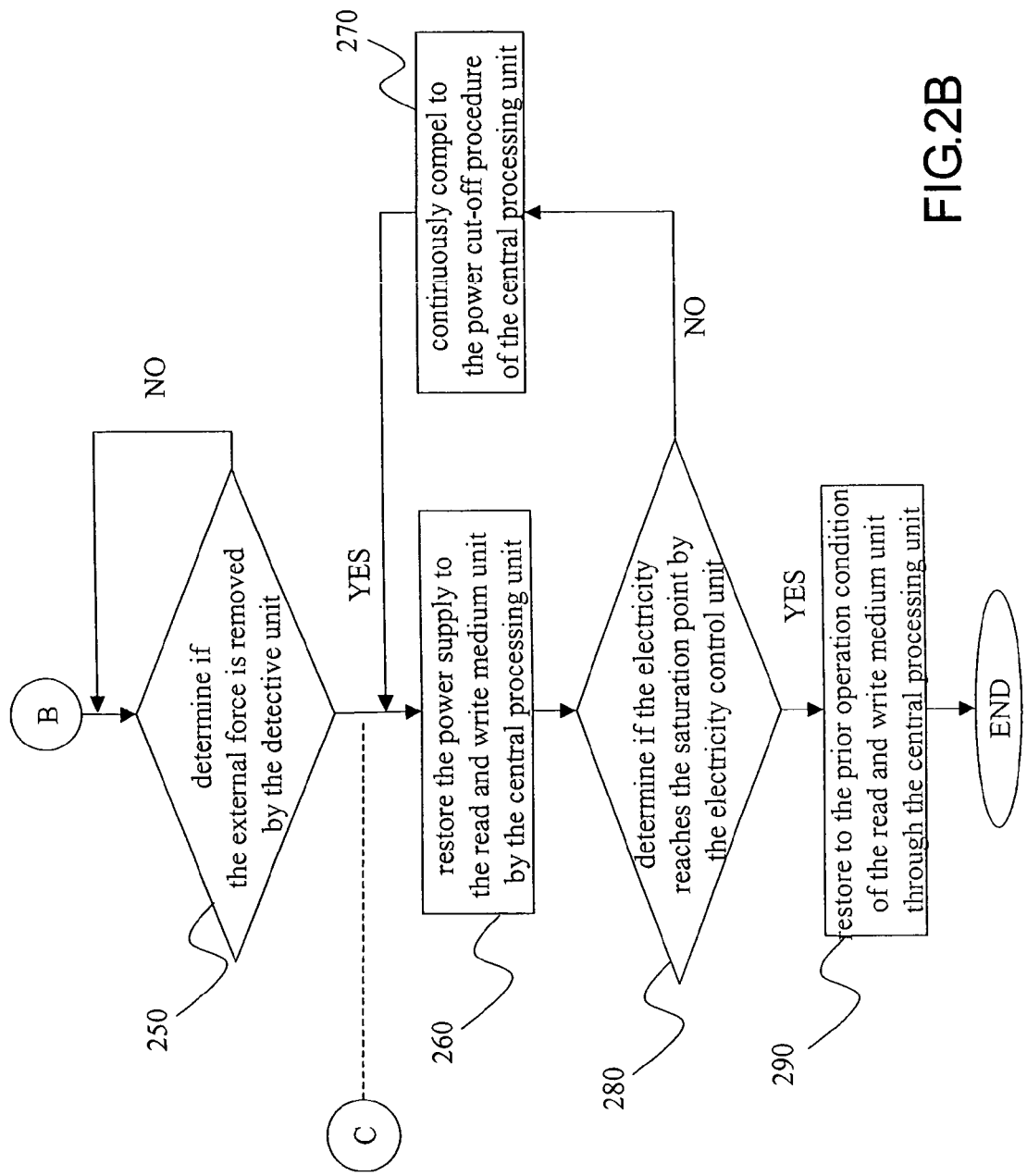

According to FIG. 2A of restoring the protection device 100 of a read and write medium apparatus, a detective unit 10 determines if an external force detected is greater than a critical point (Step 200); the critical point varies from the materials constituting respective read and write medium apparatus. If the external force detected is not greater than critical point, the detective unit 10 continuously detects the external force condition; if the external force detected is greater than the pre-set critical point, another flowchart of Process A follows Step 200 to illustrate the details. According to Process A illustrated in FIG. 2C, the detective unit 10 sends out an attack signal (Step 201), a first arithmetic unit 20 subsequently calculates the attack signal value and sends to a switch unit 30 (Step 202), the switch unit 30 informs the central processing unit 40 after the attack signal is received (Step 203). A central processing unit 40 records the condition of a read and write medium unit 50 and sends out an interrupting command (Step 210), subsequently, an electricity control unit 70 determines if the electricity reaches a saturation point (Step 220). If the electricity does not reach a saturation point, the operation of the read and write medium unit 50 is broken off and parked with the interrupting command (Step 240), the read and write medium unit 50 is then informed to park the pickup module and the process is ended. Seeing that said steps are the compelling break-off process of prior art, no further description will be detailed herein. If the electricity reaches a saturation point, the operation of the read and write medium unit 50 is broken off and parked with the interrupting command and the power source of the read and write medium unit 50 is compelled to cut off by the central processing unit 40 (Step 230), the read and write medium unit 50 then enters into the non-operating condition and the Step goes to Process B. According to Process B illustrated in FIG. 2B, the detective unit 10 determines if the external force is removed (Step 250), if YES, the apparatus is still in the non-operating condition and the detective unit 10 continuously detects the condition. If the external force is removed, Process C goes after Step 250 to illustrate the detailed flow. According to Process C illustrated in FIG. 2D, the detective unit 10 breaks off the attack signal (Step 251), subsequently, a second arithmetic unit 60 sends out a restoring signal (Step 252), the switch unit 30 then informs the central processing unit 40 after the restoring signal is received (Step 253). The central processing unit 40 then restores the power supply to the read and write medium unit 50 (Step 260). Subsequently, the electricity control unit 70 determines if the electricity reaches the saturation point (Step 280), if NO, the central processing unit 40 continuously carries out the compelling cut-off procedure (Step 270); if YES, the central processing unit 40 restores to the prior condition of the read and write medium unit 50 (Step 290); the process is then ended.

Embodiment 1

Figure 3A:
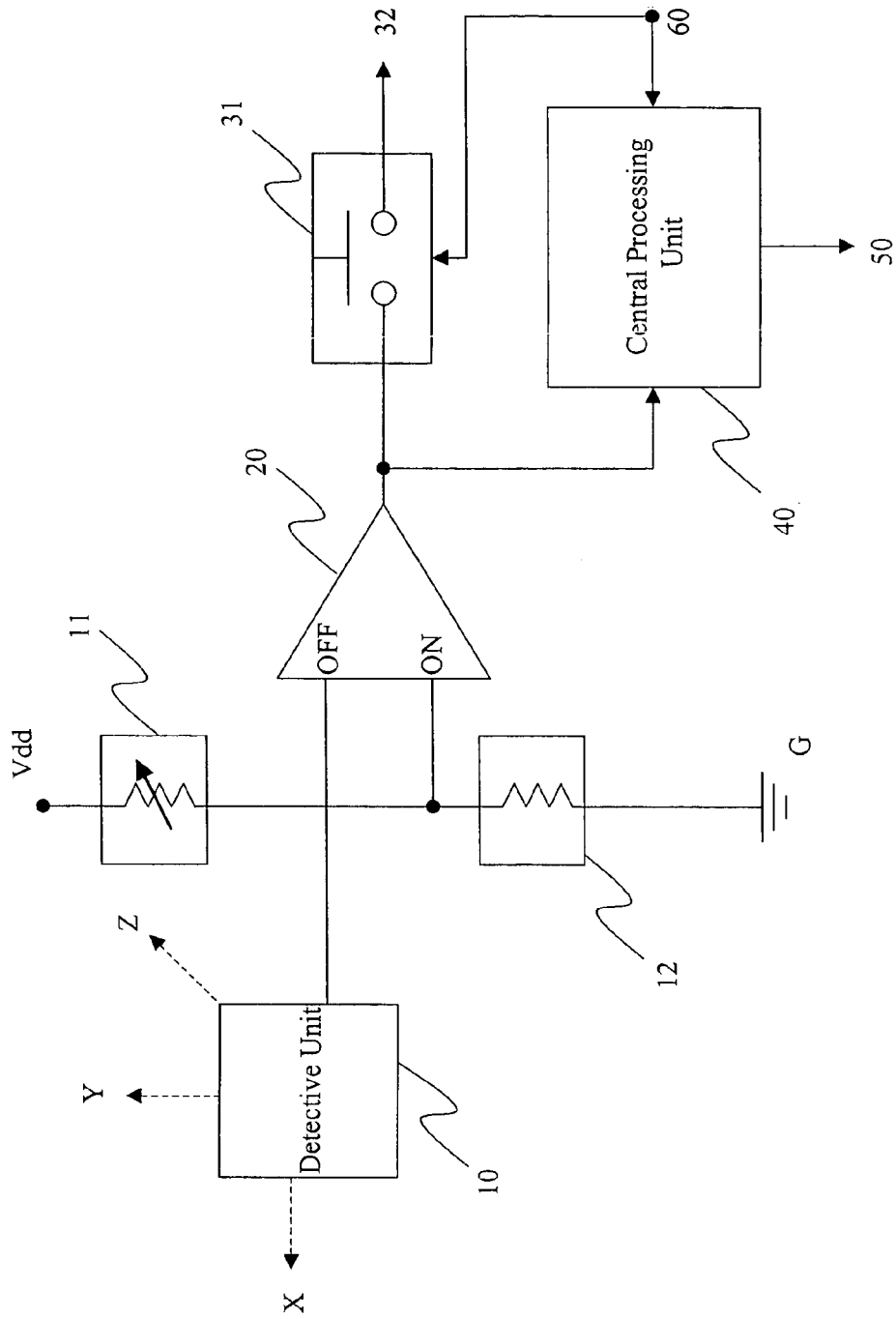
FIGS. 3A and 3B are circuit diagrams of a portable Hard Disk Drive (HDD) illustrated in the first embodiment the according to the invention.
Figure 3B:
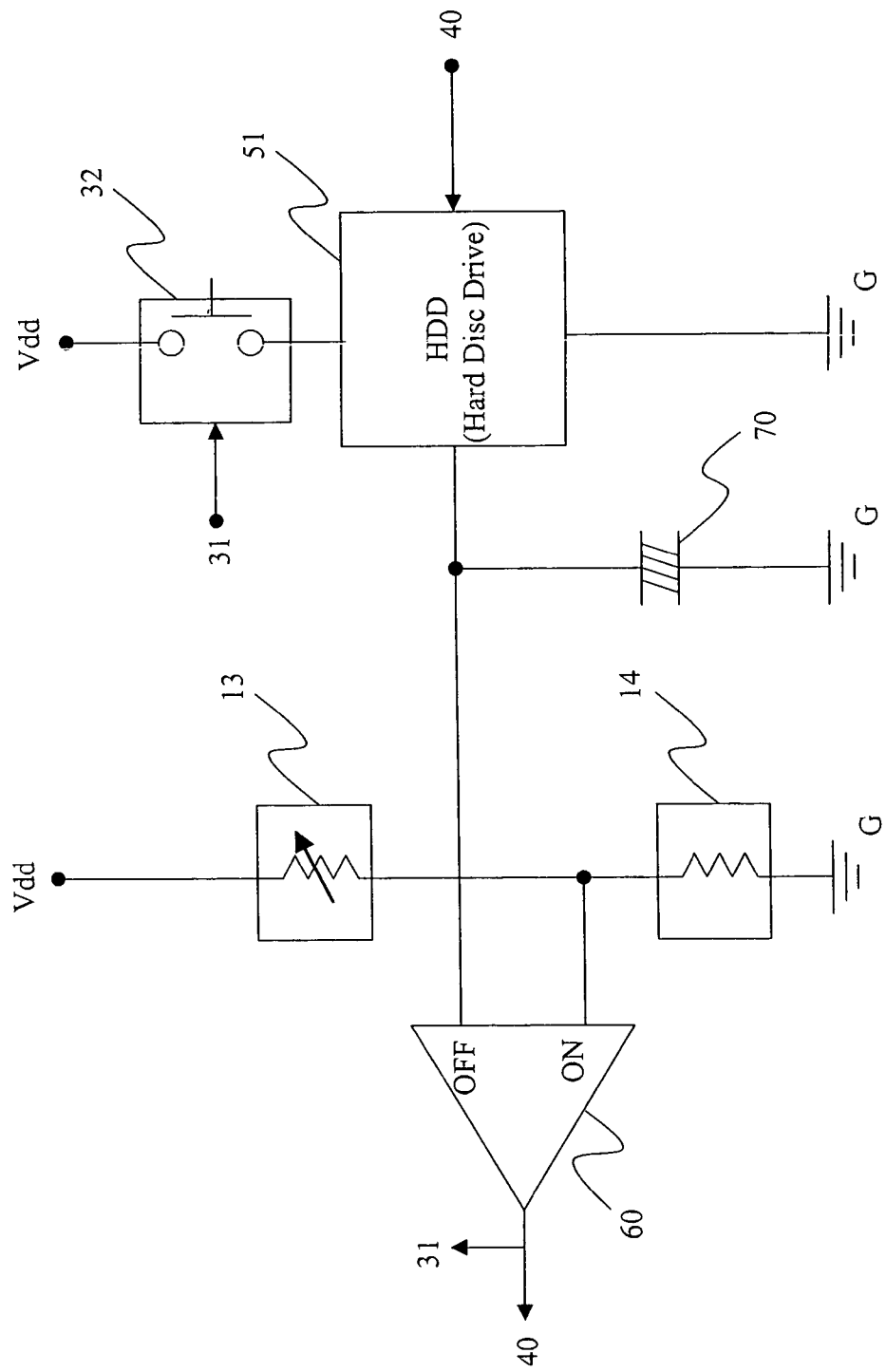

FIGS. 3A and 3B are circuit diagrams of a portable Hard Disk Drive (HDD) illustrated in the first embodiment the according to the invention. The circuits of a portable Hard Disk Drive (HDD) are illustrated as follows.

It is known from the Figures that the resultant of forces of X, Y and Z axes detected by a detective unit 10 is the external force mentioned by the invention. If the external force is greater than a pre-set critical point, and then loaded value after the adjustment of a variable load component 11 and a load component 12 enables a first arithmetic unit 20 to be informed to send an attack signal to a first switch unit 31. Subsequently, the signal is sent to a central processing unit 40 and the central processing unit 40 stores the operation condition of a Hard Disk Drive (HDD) 51. The mechinasm then determines if the electricity in an electricity control unit 70 reaches a saturation point. If the electricity reaches a saturation point, the central processing unit 40 will check variable load component 13 and load component 14 and the power source is compelled to cut off by a second switch unit 32. The detective unit 10 then continuously detects if there is still an external force or the external force detected is less than the pre-set critical point; if YES, a recovering signal is sent to inform the first arithmetic unit 20 and to the first switch unit 31, the power supply to the Hard Disk Drive (HDD) 51 is then directly restored. Subsequently, a second arithmetic unit 60 determines if the electricity in the electricity control unit 70 reaches the saturation point, if YES, the second arithmetic unit 60 sends out a saturation restoring signal to inform the central processing unit 40 to restore the prior operation condition of the Hard Disk Drive (HDD) 51.

The Figures illustrated the fundamental circuit diagram of a Hard Disk Drive (HDD) are slightly introduced, as the invention focuses on the protection device and method of an apparatus against the damage by shock, drop and/or collision.

FIGS. 4A, 4B, 4C and 4D are flow charts of the protection method of a Hard Disk Drive (HDD) illustrated in the first embodiment according to the invention.

Figure 4A:
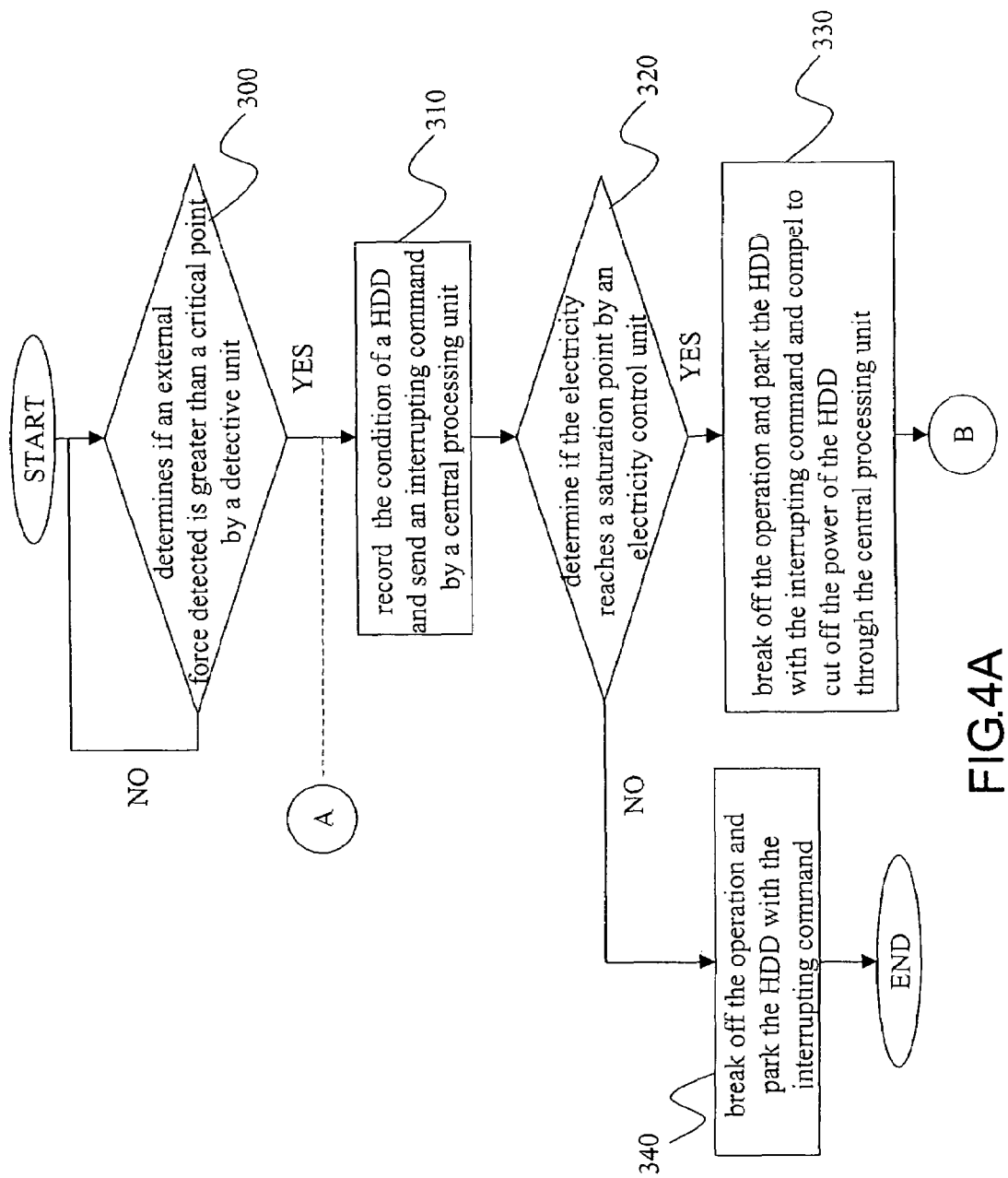
FIGS. 4A, 4B, 4C and 4D are flow charts of the protection method of a portable Hard Disk Drive (HDD) illustrated in the first embodiment according to the invention.
Figure 4B:
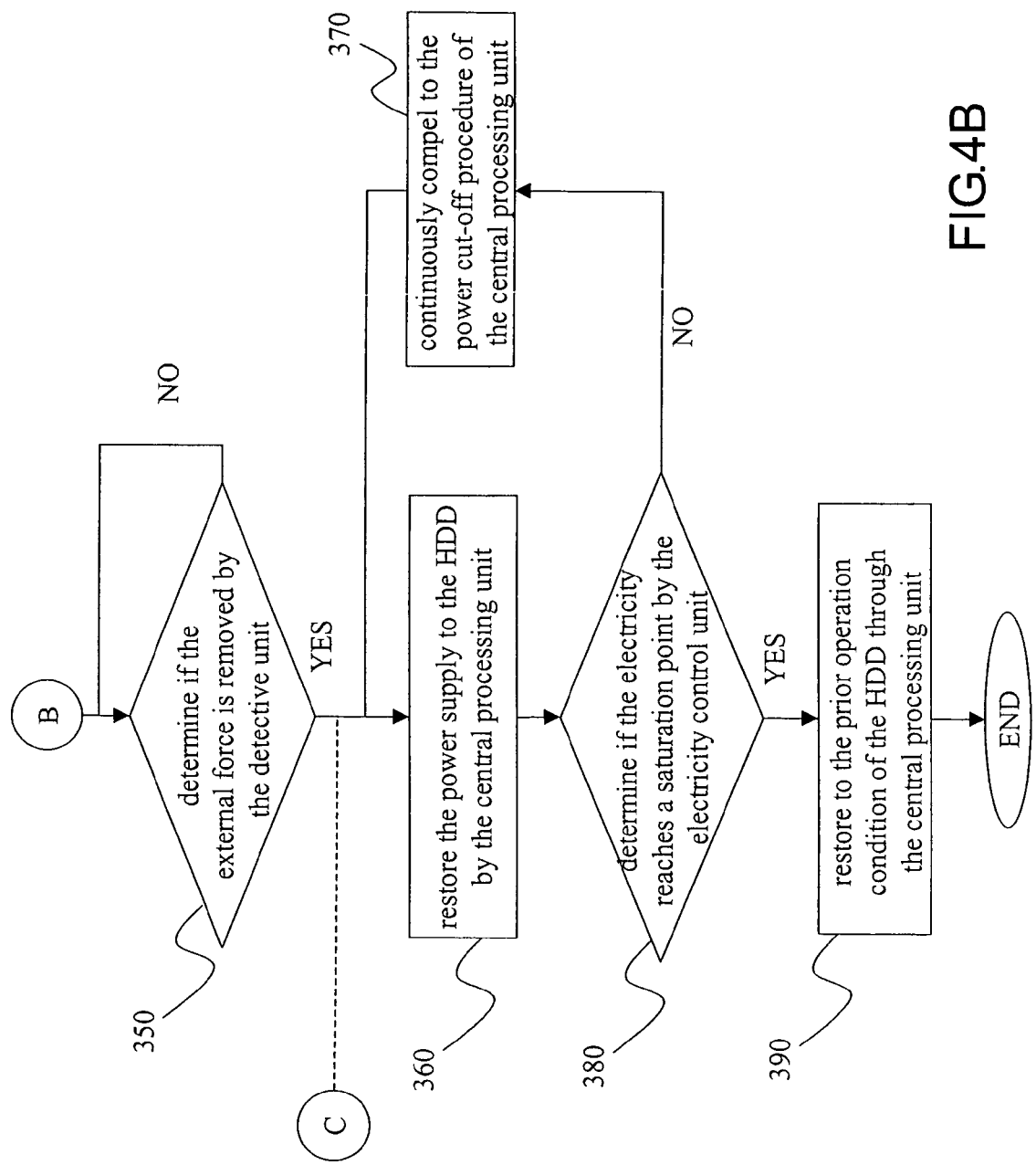
Figure 4D:
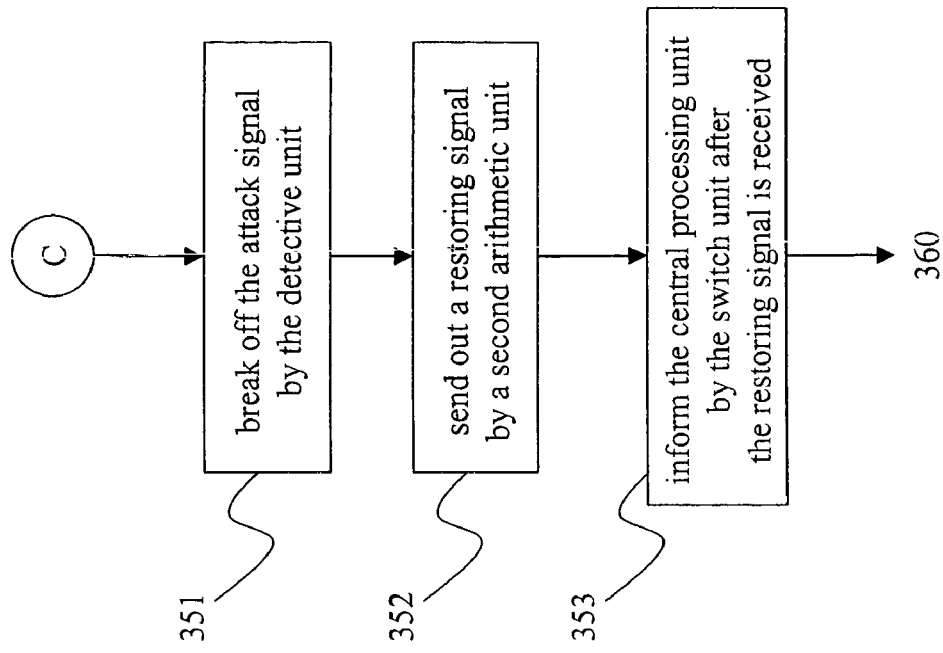
Figure 4C:
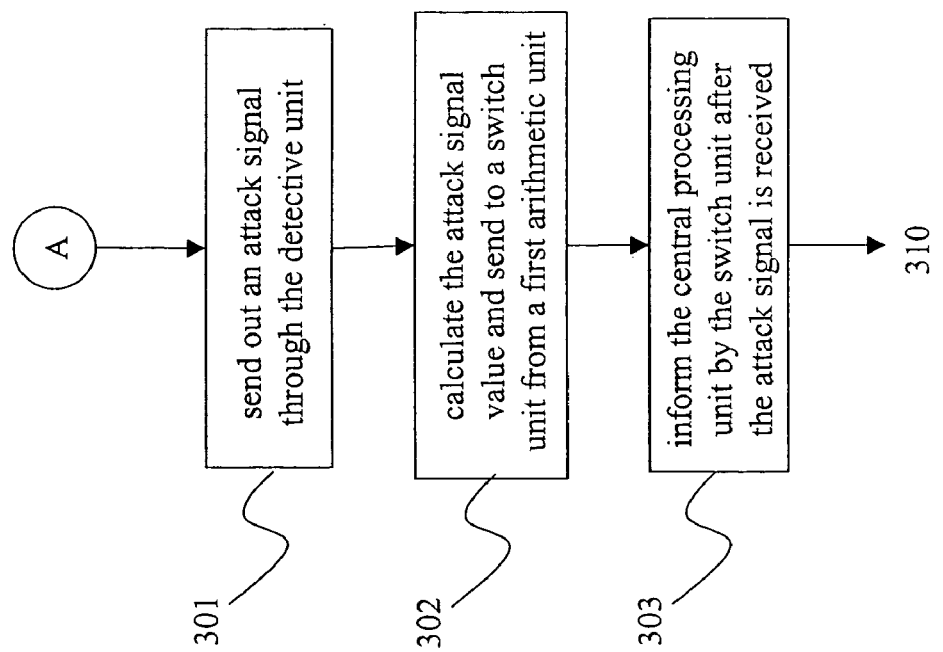

According to the flow chart of the protection method of a Hard Disk Drive (HDD) illustrated in FIG. 4A, a detective unit 10 determines if an external force detected is greater than a critical point (Step 300), the critical point varies from the materials constituting respective Hard Disk Drive (HDD) exteriors. If the external force detected is not greater than critical point, the detective unit 10 continuously detects the external force condition; if the external force detected is greater than the pre-set critical point, another flowchart of Process A follows Step 300 to illustrate the details. According to Process A illustrated in FIG. 4C, the detective unit 10 sends out an attack signal (Step 301), a first arithmetic unit 20 subsequently calculates the attack signal value and sends to a switch unit 30 (Step 302), the switch unit 30 informs the central processing unit 40 after the attack signal is received (Step 303). A central processing unit 40 records the condition of a Hard Disk Drive (HDD) 51 and sends out an interrupting command (Step 310), subsequently, an electricity control unit 70 determines if the electricity reaches a saturation point (Step 320). If the electricity does not reach a saturation point, the operation of the Hard Disk Drive (HDD) 51 is broken off and parked with the interrupting command (Step 340), the Hard Disk Drive (HDD) 51 is then informed to park the pickup module and the process is ended. Seeing that said steps are the compelling break-off process of prior art, which will not further detail herein. If the electricity reaches a saturation point, the operation of the Hard Disk Drive (HDD) 51 is broken off and parked with the interrupting command and the power source of the Hard Disk Drive (HDD) 51 is compelled to cut off by the central processing unit 40 (Step 330), the Hard Disk Drive (HDD) 51 then enters into the non-operating condition and the Step goes to Process B. According to Process B illustrated in FIG. 4B, the detective unit 10 determines if the external force is removed (Step 350), if No, the apparatus is still in the non-operating condition and the detective unit 10 continuously detects the condition. If the external force is removed, Process C goes after Step 350 to illustrate the detailed flow. According to Process C illustrated in FIG. 4D, the detective unit 10 breaks off the attack force (Step 351), subsequently, a second arithmetic unit 60 sends out a restoring signal (Step 352), the switch unit 30 then informs the central processing unit 40 after the restoring signal is received (Step 353). The central processing unit 40 then restores the power supply to the Hard Disk Drive (HDD) 51 (Step 360). Subsequently, the electricity control unit 70 determines if the electricity reaches the saturation point (Step 380), if NO, the central processing unit 40 continuously carries out the compelling cut-off procedure (Step 370); if YES, the central processing unit 40 restores to the prior condition of the Hard Disk Drive (HDD) 51 (Step 390), the process is then ended.

Embodiment 2

Figure 5A:
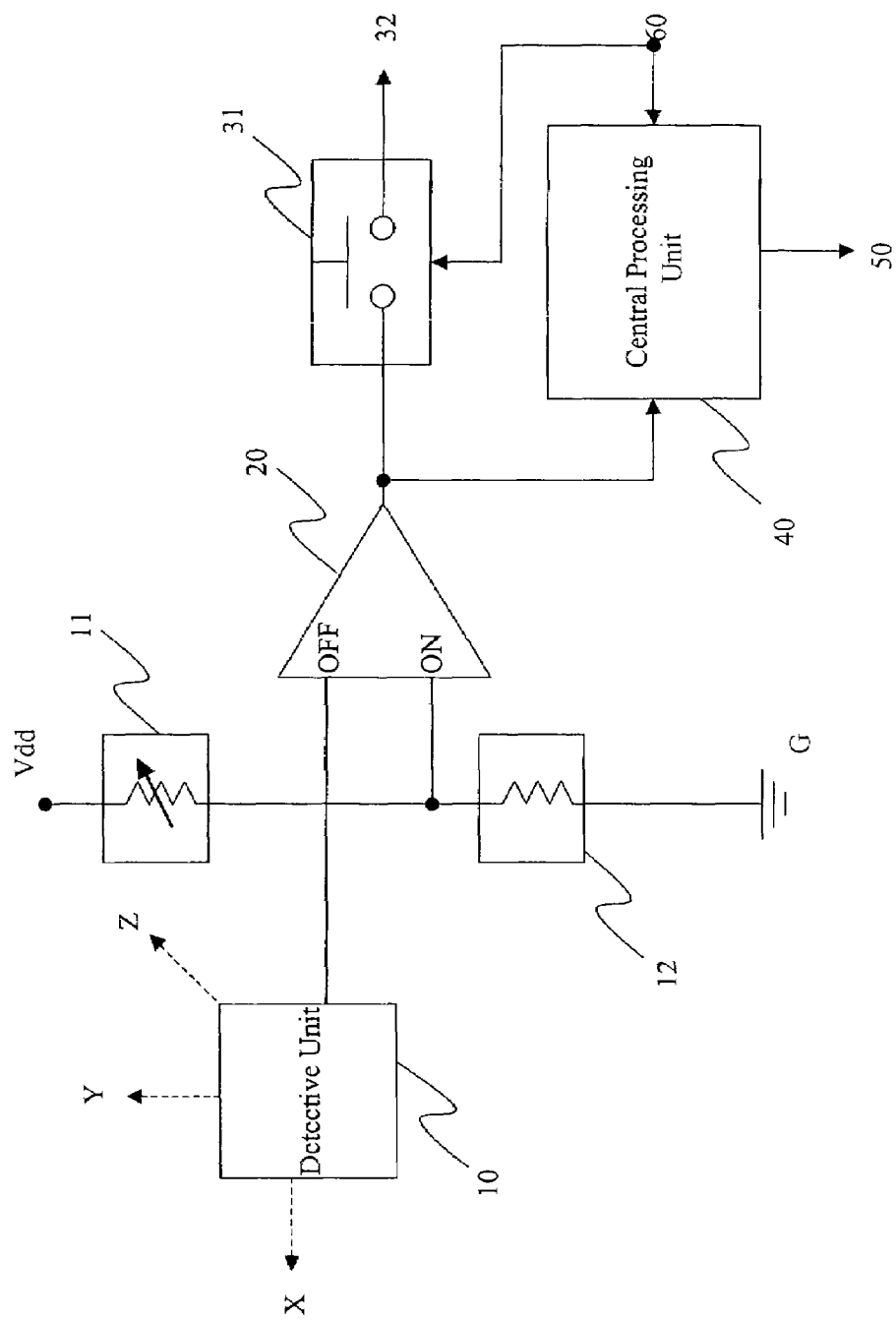
FIGS. 5A and 5B are circuit diagrams of a CD device illustrated in a second embodiment according to the invention.
Figure 5B:
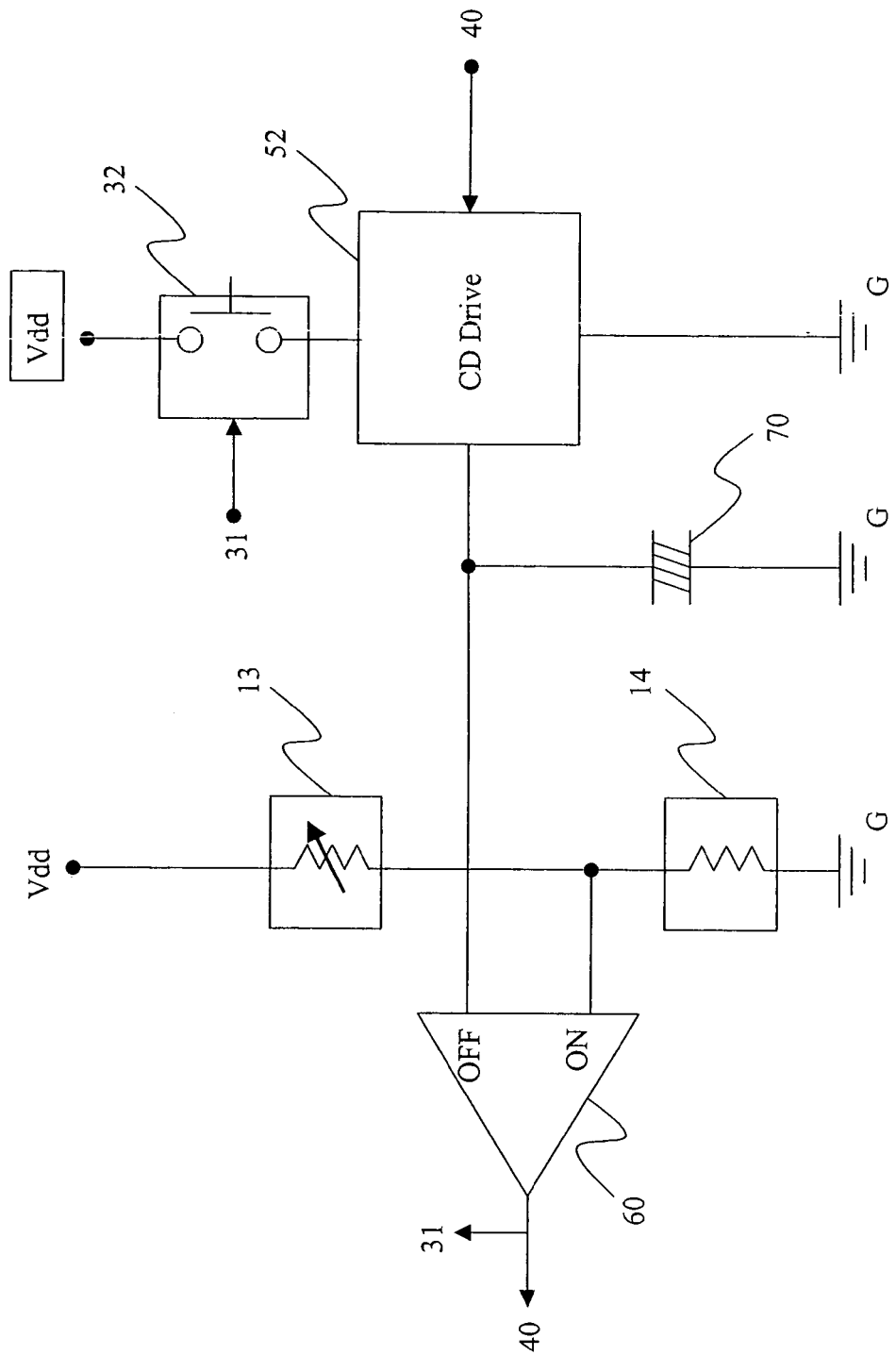

FIGS. 5A and 5B are circuit diagrams of a CD drive illustrated in a second embodiment according to the invention. The circuit diagrams showing the effects of a CD drive in the second embodiment are identical with the circuit diagrams in the first embodiment in substance; the difference is using a CD drive as a substitute for a Hard Disk Drive (HDD), therefore, no further description will be made below.

FIGS. 6A, 6B, 6C and 6D are flow charts of the protection method of a CD drive illustrated in the second embodiment according to the invention.

Figure 6A:
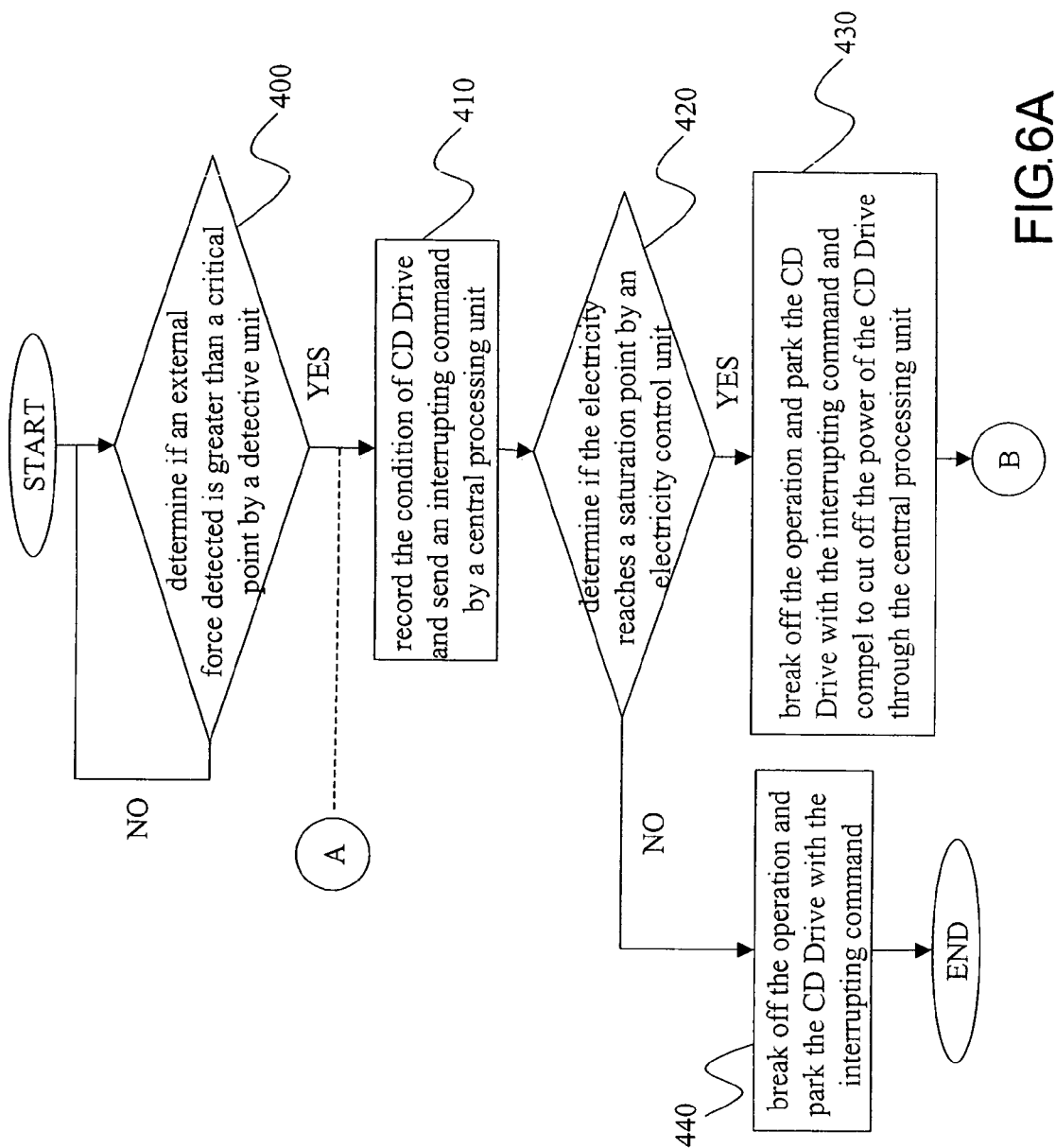
Figure 6B:
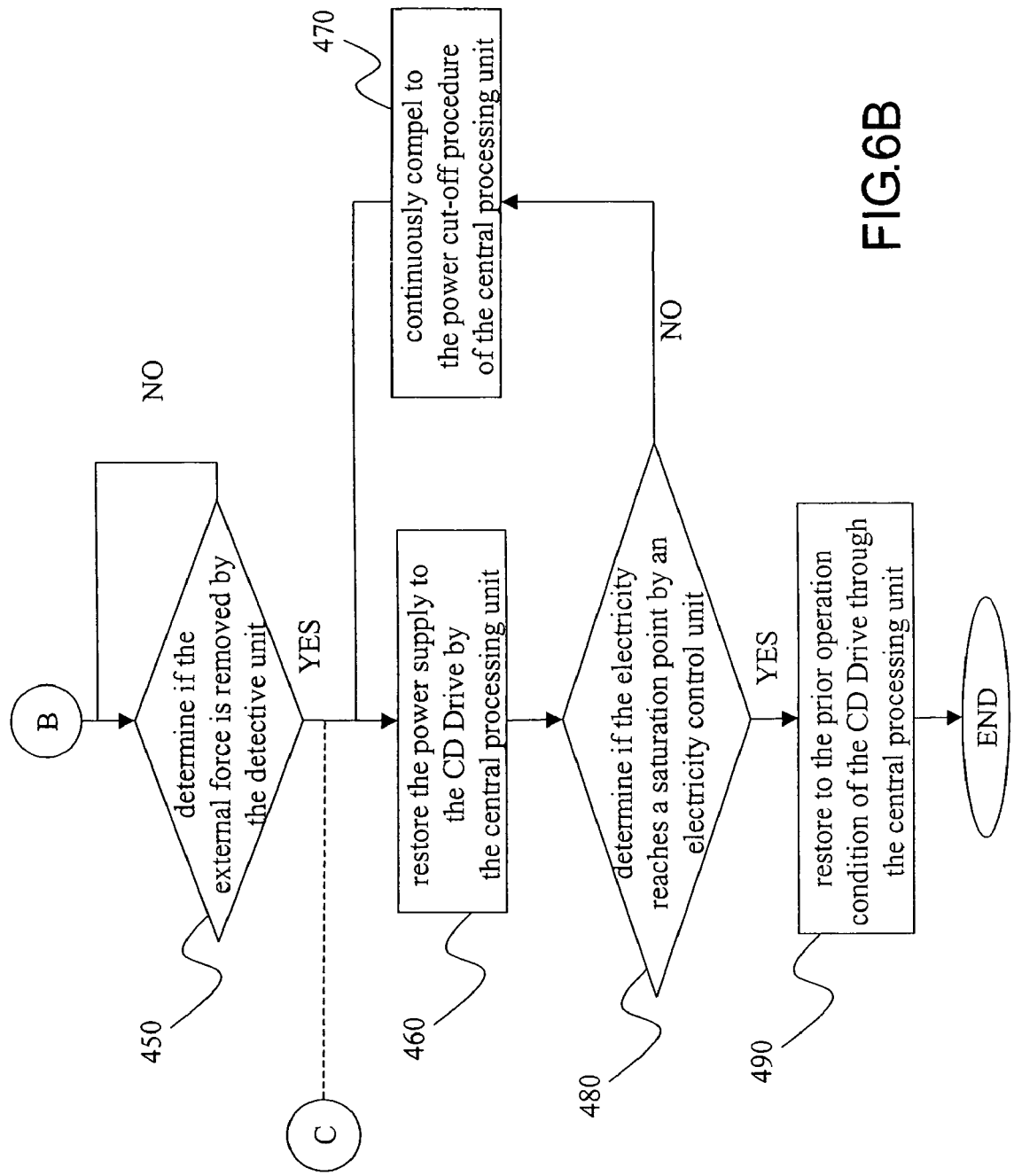

According to the protection device of a CD drive illustrated in FIG. 6A, a detective unit 10 determines if an external force detected is greater than a critical point (Step 400); the critical point varies according to the materials constituting respective CD drive exteriors. If an external force detected is not greater than the critical point, the detective unit 10 continuously detects the condition; if an external force detected is greater than the critical point, Process A goes after Step 400 to have detailed description. According to Process A illustrated in FIG. 6C, the detective unit 10 sends out an attack signal (Step 401), subsequently, a first arithmetic unit 20 calculates the attack signal value and sends to a switch unit 30 (Step 402), the switch unit 30 then informs a central processing unit 40 after the attack signal is received (Step 403). A central processing unit 40 records the condition of a CD drive 52 and sends an interrupting command (Step 410). Subsequently, an electricity control unit 70 determines if the electricity reaches a saturation point (Step 420), if NO, the operation of the CD drive 52 is broken off and parked with the interrupting command (Step 440), the CD drive 52 is informed to park the pickup module and the process is ended. Seeing that said steps are the compelling break-off process of prior art, which will not further detail herein. If the electricity reaches a saturation point, the operation of the CD drive 52 is broken off and parked with the interrupting command and the power source of the the CD drive 52 is compelled to cut off by the central processing unit 40 (Step 430), the CD drive 52 then enters into the non-operating condition and the process goes to Process B. According to Process B illustrated in FIG. 6B, the detective unit 10 determines if the external force is removed (Step 450), if No, the apparatus is still in the non-operating condition and the detective unit 10 continuously detects the condition. If the external force is removed, Process C goes after Step 450 to illustrate the detailed flow. According to Process C illustrated in FIG. 6D, the detective unit 10 breaks off the attack signal (Step 451), subsequently, a second arithmetic unit 60 sends out a restoring signal (Step 452), the switch unit 30 then informs the central processing unit 40 after the restoring signal is received (Step 453). The central processing unit 40 then restores the power supply to the CD drive 52 (Step 460). Subsequently, the electricity control unit 70 determines if the electricity reaches a saturation point (Step 480), if NO, the central processing unit 40 continuously carries out the compelling cut-off procedure (Step 470); if YES, the central processing unit 40 restores to the prior condition of the CD drive 52 (Step 490), the process is then ended.

It is known from the said embodiments that the apparatuses illustrated with, the characteristics of having the pickup module components and the same capability of data storage easily cause such apparatuses to damage due to shock, drop and/or collision. In conclusion from the above, the disclosed structure of the invention is new design separating from prior arts. The present invention is, therefore, disclosed herein for its practicability and advancement.

It is of course to be understood that the embodiments described herein are merely illustrative of the principles of the invention. A wide variety of modifications thereto may be affected by persons skilled in the art without departing from the spirit and scope of the invention as set forth in the following claims.

What is claimed is:

1. A protection device of a read and write medium apparatus for ensuring the minimum damage to the apparatus when said apparatus under an external force, comprising:
   a central processing unit for recording and restoring the operation status of said apparatus;
   a detective unit for detecting the external force and reckoning a value of the external force, wherein when the value is greater than a critical point, said detective unit sends an attack signal and when the external force is removed said detective unit sends a restoring signal;
   a first arithmetic unit for informing said central processing unit of recording and restoring a operation status of said protection device, said first arithmetic unit sending an interrupting signal when receiving the attack signal and sending a recovering signal when receiving the restoring signal;
   a read and write medium unit for storing, reading and writing data;
   a switch unit for controlling a power source of said protection device,
   said switch unit resetting a power of said read and write medium unit when receiving the recovering signal;
   an electricity control unit for achieving the electricity saturation while said read and write medium unit is operating, discharging electricity while said read and write medium unit cuts off the power; and
   a second arithmetic unit for evaluating a condition of said electricity control unit, said second arithmetic unit sending a saturation interrupting signal when receiving the interrupting signal during the electricity saturation condition; sending a saturation restoring signal when receiving the recovery storing signal during the electricity saturation condition;
   wherein said central processing unit recording the operation status and carrying out the power cut-off when receiving the interrupting signal; compelling to the power cut-off of the switch unit when receiving the saturation interrupting signal, and restoring to the prior operation condition of the device when receiving the saturation restoring signal.

2. The protection device of a read and write medium apparatus of claim 1, wherein said read and write medium unit is a pickup module.

3. The protection device of a read and write medium apparatus of claim 1, wherein the read and write medium apparatus can be either a portable Hard Disk Drive (PHDD), a Pen Driver, a portable PC (Notebook computer), a personal digital assistant (PDA), a CD Walkman, a CD-ROM drive, a CD-RW drive, a DVD player, a DVD drive, a DVD-ROM, a DVD+RW, or a DVD−RW drive.

4. A protection, method of a read and write medium apparatus for ensuring the minimum damage to the apparatus when said apparatus under an external force, comprising the following steps:
   detecting if the value of an external force greater than a critical point by a detective unit;
   recording a condition of a read and write medium unit and sending an interrupting command by a central processing unit;
   determinging if the electricity reaching a saturation point by an electricity control unit;
   compelling to cut-off the power of the read and write medium unit through the central processing unit;
   determining if the external force is removed by the detective unit;

restoring the power supply to the read and write medium unit through the central processing unit;

determining if the electricity reaching the saturation point through the electricity control unit; and restoring the prior operation condition of the read and write medium unit through the central processing unit.

5. The protection method of a read and write medium apparatus of claim 4, wherein the critical point varies from the materials of constituting different read and write medium apparatuses.

6. The protection method of a read and write medium apparatus of claim 4, wherein the step of detecting if an external force greater than a critical point by a detective unit comprising the following steps:

sending an attack signal through the detective unit;

calculating the attack signal value and sending the value to a switch unit from a first arithmetic unit; and informing the central processing unit after receiving the attack signal by the switch unit.

7. The protection method of a read and write medium apparatus of claim 4, wherein the step of determining if the external force is removed by the detective unit comprising the following steps:

breaking off the attack signal by the detective unit;

sending a restoring signal by a second arithmetic unit; and informing the central processing unit after receiving the restoring signal by the switch unit.

8. The protection method of a read and write medium apparatus of claim 4, wherein the data processing apparatus can be either a portable Hard Disk Drive (PHDD), a Pen Driver, a portable PC (Notebook computer), a personal digital assistant (PDA), a CD Walkman, a CD-ROM drive, a CD-RW drive, a DVD player, a DVD drive, a DVD-ROM, a DVD+RW, or a DVD−RW drive.

9. A protection device of a portable Hard Disk Drive (HDD) for ensuring the minimum damage to the apparatus when said apparatus under an external force, comprising:

a central processing unit for recording and restoring the operation status of said Hard Disk Drive;

a detective unit for detecting the external force and reckoning a value of the external force, wherein when the value is greater than a critical point, said detective unit sends an attack signal and when the external force is removed said detective unit sends a restoring signal;

a first arithmetic unit for informing said central processing unit of recording and restoring a operation status of said Hard Disk Drive (HDD), said first arithmetic unit sending an interrupting signal when receiving the attack signal and sending a recovering signal when receiving the restoring signal;

a Hard Disk drive (HDD) for storing, reading and writing data;

a switch unit for controlling a power source of said Hard Disk drive(HDD), said switch unit resetting a power of said read and write medium unit when receiving the recovering signal;

an electricity control unit for achiving the electricity saturation while said Hard Disk Drive (HDD) is operating, discharging electricity while said Hard Disk Drive (HDD) breaks off; and a second arithmetic unit for evaluating a condition of said electricity control unit, said second arithmetic unit sending a saturation interrupting signal when receiving the interrupting signal during the electricity saturation condition; sending a saturation restoring signal when receiving the recovery storing signal during the electricity saturation condition;

wherein said central processing unit recording the operation status and carrying out the power cut-off when receiving the interrupting signal; compelling to the power cut-off of the switch unit when receiving the saturation interrupting signal, and restoring the Hard Disk Drive (HDD) operation condition when receiving the saturation restoring signal.

10. A protection method of a portable Hard Disk Drive (HDD) for ensuring the minimum damage to the apparatus when said apparatus under an external force, comprising the following steps:

detecting if the value of an external force greater than a critical point by a detective unit;

recording the Hard Disk Drive (HDD) condition and sending an interrupting command by a central processing unit;

determinging if the electricity reaching a saturation point by an electricity control unit;

compelling to cut-off the power of the Hard Disk Drive (HDD) through the central processing unit;

determining if the external force is removed by the detective unit; restoring the power supply to the Hard Disk Drive (HDD) through the central processing unit;

determining if the electricity reaching the saturation point through the electricity control unit; and restoring the prior operation condition of the Hard Disk Drive (HDD) through the central processing unit.

11. The protection method of a portable Hard Disk Drive (HDD) of claim 10, wherein the critical point varies from the materials of constituting respective portable Hard Disk Drive (HDD) exteriors.

12. The protection method of a portable Hard Disk Drive (HDD) of claim 10, wherein the step of detecting if an external force greater than a critical point by a detective unit comprising the following steps:

sending an attack signal through the detective unit;

calculating the attack signal value and sending the value to the switch unit from the first arithmetic unit; and informing the central processing unit after receiving the attack signal by the switch unit.

13. The protection method of a portable Hard Disk Drive (HDD) of claim 10, wherein the step of determining if the external force is removed by the detective unit comprising the following steps:

breaking off the attack signal by the detective unit;

sending a restoring signal by the second arithmetic unit; and informing the central processing unit after receiving the restoring signal by the switch unit.

14. A protection device of a CD device for ensuring the minimum damage to the apparatus when said apparatus under an external force, comprising:

a central processing unit for recording and restoring the operation status of said CD device;

a detective unit for detecting the external force and reckoning a value of the external force, wherein when the value is greater than a critical point, said detective unit sends an attack signal and when the external force is removed said detective unit sends a restoring signal;

a first arithmetic unit for informing said central processing unit of recording and restoring a operation status of said CD device, said first arithmetic unit sending an interrupting signal when receiving the attack signal and sending a recovering signal when receiving the restoring signal;

a CD device for reading and writing data;

a switch unit for controlling a power source of said CD device, said switch unit resetting a power of said read and write medium unit when receiving the recovering signal;

an electricity control unit for achieving the electricity saturation while said CD device is operating, discharging electricity while said CD device breaks off; and a second arithmetic unit for evaluating a condition of said electricity control unit, said second arithmetic unit sending a saturation interrupting signal when receiving the interrupting signal during the electricity saturation condition; sending a saturation restoring signal when receiving the recoverystoring signal during the electricity saturation condition;

wherein said central processing unit recording the operation status and carrying out the power cut-off when receiving the interrupting signal; compelling to cut-off the power of the switch unit when receiving the saturation interrupting signal, and restoring the CD device operation condition when receiving the saturation restoring signal.

15. The protection device of a CD device of claim 14, wherein the CD device can be either a CD-ROM drive, a CD-RW drive, a CD Walkman, a DVD player, a DVD drive, a DVD-ROM, a DVD+RW, or a DVD–RW drive.

16. A protection method of a CD device for ensuring the minimum damage to the apparatus when said apparatus under an external force, comprising the following steps:

detecting if the value of an external force greater than a critical point by a detective unit;

recording the CD device condition and sending an interrupting command by a central processing unit;

determining if the electricity reaching a saturation point by an electricity control unit;

compelling to the power cut-off of the CD device through the central processing unit;

determining if the external force is removed by the detective unit;

restoring the power supply to the CD device through the central processing unit;

determining if the electricity reaching the saturation point through the electricity control unit; and restoring the prior operation condition of the CD device through the central processing unit.

17. The protection method of a CD device of claim 16, wherein the critical point varies from the materials of constituting respective CD device exteriors.

18. The protection method of a CD device of claim 16, wherein the step of detecting if an external force greater than a critical point by a detective unit comprising the following steps:

sending an attack signal through the detective unit;

calculating the attack signal value and sending the value to the switch unit from the first arithmetic unit; and informing the central processing unit after receiving the attack signal by the switch unit.

19. The protection method of a CD device of claim 16, wherein the step of determining if the external force is removed by the detective unit comprising the following steps:

breaking off the attack signal by the detective unit;

sending a restoring signal by the second arithmetic unit; and informing the central processing unit after receiving the restoring signal by the switch unit.

20. The protection method of a CD device of claim 16, wherein the CD device can be either a CD-ROM drive, a CD-RW drive, a CD Walkman, a DVD player, a DVD drive, a DVD-ROM, a DVD+RW, or a DVD–RW drive.

* * * * *